(12) United States Patent
Hussain (10) Patent No.: US 7,979,097 B2
(45) Date of Patent: Jul. 12, 2011

(54) POWER MANAGEMENT FOR MULTIMODE WIRELESS COMMUNICATION DEVICE

(75) Inventor: Farooq S. Hussain, Bangalore (IN)

(73) Assignee: Kyocera Corporation, Kyoto (JP)

( * ) Notice: Subject to any disclaimer, the term of this patent is extended or adjusted under 35 U.S.C. 154(b) by 771 days.

(21) Appl. No.: 12/050,831

(22) Filed: Mar. 18, 2008

(65) Prior Publication Data

US 2009/0239574 A1 Sep. 24, 2009

(51) Int. Cl.
*H04B 1/38* (2006.01)

(52) U.S. Cl. ....... 455/574; 455/41.2; 455/572; 455/573; 455/343.1; 455/343.2; 370/311; 370/318; 713/300; 713/310; 713/320; 713/324

(58) Field of Classification Search ............... 455/41.2, 455/422.1, 552.1, 572, 573, 574, 343.1–343.6; 370/311, 318; 713/300–340
See application file for complete search history.

(56) References Cited

U.S. PATENT DOCUMENTS

| | | | |
|---|---|---|---|
| 2002/0184546 A1* | 12/2002 | Sherburne, Jr. | 713/322 |
| 2007/0184873 A1 | 8/2007 | Li et al. | |
| 2008/0168286 A1* | 7/2008 | Tupman | 713/320 |

FOREIGN PATENT DOCUMENTS

| | | |
|---|---|---|
| EP | 1 578 095 | 9/2005 |
| EP | 1 804 426 | 7/2007 |
| WO | WO 2005/114917 | 12/2005 |
| WO | WO 2007/133526 | 11/2007 |

OTHER PUBLICATIONS

Dimitris N Kalofonos and Mika Saraanen, "A Network Connectivity Power-Saving Mechanism for Mobile Devices in DLNA Home Networks", Consumer Communications and Networking Conference 2007, Jan. 1, 2007, IEEE.
MADE-IN-CHINA.COM, GSM/Vowlan Dual-Mode Phone, http://www.made-in-china.com/showroom/qiashun/product-detailnMqQlicoJxVI/China-GSM-Vowlan-Dual-Mode-Phone.html, accessed on Mar. 18, 2008.

* cited by examiner

*Primary Examiner* — Rafael Pérez-Gutiérrez
*Assistant Examiner* — Neda Behrooz (57) ABSTRACT

A multimode wireless communication device comprising a Wi-Fi module, a cellular communication module, and an integrated power management module is described. The integrated power management module or power management means is configured to manage power for the Wi-Fi module and the cellular communications module. The integrated power management module comprises a Wi-Fi power save mode, a Wi-Fi sleep mode, a Wi-Fi power down mode, a cellular power save mode, and a cellular low power mode. In the Wi-Fi power save mode a timer switches the Wi-Fi module between a Wi-Fi power save awake state and a Wi-Fi power save sleep state.

20 Claims, 5 Drawing Sheets

POWER MANAGEMENT FOR MULTIMODE WIRELESS COMMUNICATION DEVICE

FIELD OF THE INVENTION

The present invention relates to a power management module for a multi-mode wireless communication device comprising a Wi-Fi module and a cellular communications module. More particularly, the invention relates to providing a variety of different power management modes for a wireless communications device having a Wi-Fi module and a cellular communications module.

BACKGROUND

Wi-Fi is a wireless technology associated with the Wi-Fi Alliance and improves the interoperability of local area network products based on the IEEE 802.11 standards. The IEEE 802.11 Wireless Local Area Network technology is a commonly available technology that is being integrated with wireless communication devices referred to as dual-mode, tri-mode, and more generally a "multi-mode" wireless communication devices. An illustrative dual mode phone includes a Wi-Fi/CDMA or Wi-Fi/GSM mobile phone.

A multimode wireless communication device is a device that combines at least two different communication access technologies (CATs). The CATs may operate at different frequencies and may operate using different wireless standards, even though the CATs operate within the same frequency band. For example, a multimode handset may support cdma2000 and GSM at 800 MHz, and in a particular market having an A side operator and a B side operator there may be a combination of cdma2000 and GSM. Wireless communications devices that support multiple CATs, e.g. CDMA2000, WCDMA, GSM, and Wi-Fi, must determine the appropriate CAT to acquire the available CAT.

Currently, multi-mode wireless communication devices that include Wi-Fi technology have a major setback, namely, the high power consumption by the Wi-Fi component eventually leads to a reduced battery life. The 802.11 WLAN Medium Access Protocol (MAC) protocol defines only two operational modes, in which a mobile can operate, namely, active mode and power saving mode.

A Wi-Fi module housed in a wireless communication device operates in either an awake state or a doze state. In an awake state, the Wi-Fi module can transmit, receive or sense the physical channel, and it actually continues to sense the channel unless it either transmits or receives a frame. In doze state, the Wi-Fi module is not able to transmit or receive, and consumes very little energy. The Wi-Fi power management module determines how a Wi-Fi module switches between the awake state and doze state. With respect to a multimode wireless communication device, the Wi-Fi power management module operates independently of the other CATs and network communications with various CATs.

Cellular technologies such as Code Division Multiple Access (CDMA) automatically switch to power-save mode if the wireless device has not found a signal after a predetermined period of searching, e.g. 15 minutes. Power save mode decreases the drain on the battery. When the phone is in power save mode, it decreases the drain on the battery. When the phone is in power save mode, you cannot make calls and the no signal icon appears on the screen. The phone periodically rechecks for a signal. Typically, the user can press any key to check for service. Generally, when the phone finds a signal, the phone automatically switches out of the power-save mode and displays the signal strength icon.

Current multimode wireless communication devices have dedicated CAT circuitry that meets the requirements set forth by standard performance requirements. Generally, these standards operate independently of one another. Thus, each CAT module in the multimode wireless communication is actively attempting to communicate with a CAT network becomes a drain on system resources such as the battery.

By way of example and not of limitation, for a dual mode Wi-Fi/CDMA communication device, the CDMA mode has a power management module that is dependent on network communications. Although, the Wi-Fi mode does have power management for the mobile handset, the Wi-Fi power management module operates independently of the CDMA power management module and consumes additional power resources.

Thus, there is a need for an integrated power management module for a dual mode Wi-Fi/CDMA communication device that overcomes the limitations of high power consumption, reduced battery lifetime, and that can be integrated with the firmware of the dual mode wireless communication device.

SUMMARY

A multimode wireless communication device is described. The device comprises a Wi-Fi module, a cellular communication module, and an integrated power management module. The Wi-Fi module is housed within the multimode wireless communication device and is configured to communicate with an access point operatively coupled to a wide area network. The cellular communication module is also housed within the multimode wireless communication device and is configured to communicate with a base station and a mobile switching station. The integrated power management module or power management means is configured to manage power for the Wi-Fi module and the cellular communications module. The integrated power management module or power management means comprises a Wi-Fi power save mode, a Wi-Fi sleep mode, a Wi-Fi power down mode, a cellular power save mode, and a cellular low power mode. In the Wi-Fi power save mode, a timer triggers switching the Wi-Fi module between a Wi-Fi power save awake state and a Wi-Fi power save sleep state. The Wi-Fi deep sleep mode is activated when Wi-Fi communications with an access point is disabled. The Wi-Fi power down mode is activated when a Wi-Fi shutdown instruction is received and results in at least one IC corresponding to the Wi-Fi module being turned off. The cellular power save mode is enabled when the cellular communications module enters a cellular idle mode and the Wi-Fi module enters either the Wi-Fi deep sleep mode or the Wi-Fi power down mode. The cellular low power mode is enabled when the Wi-Fi module is activated and the Wi-Fi module enters either a Wi-Fi active more or the Wi-Fi power save mode.

The integrated power management module or power management means enables the Wi-Fi power save mode, the Wi-Fi deep sleep mode, and the Wi-Fi power down mode when the wireless communication device is operating in a Wi-Fi power management mode. Additionally, the power management module or power management means enables the cellular power save mode and the cellular low power mode when the wireless communication device is operating in a cellular power management mode. In the illustrative embodiment, the illustrative cellular communications module comprises a CDMA compliant module.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the wireless multimode devices described hereinafter may vary as to configuration and as to details. Additionally, the methods may vary as to details, order of the actions, or other variations without departing from the illustrative method disclosed herein.

The illustrative embodiment described herein is embodied in the software and/or the hardware portion of a wireless communication device such as a mobile phone. The wireless communication device is a multimode device comprising at least two wireless communication technologies. The power management module or power management means described herein is for a multi-mode wireless communication device comprising a Wi-Fi module and a cellular communications module. A variety of different power management modes for a wireless communications device having a Wi-Fi module and a cellular communications module are described. By way of example and not of limitation, the cellular communication module operates using CDMA cellular standards, although reference is also made to the use of GSM cellular standards and other such standards.

Figure 1:
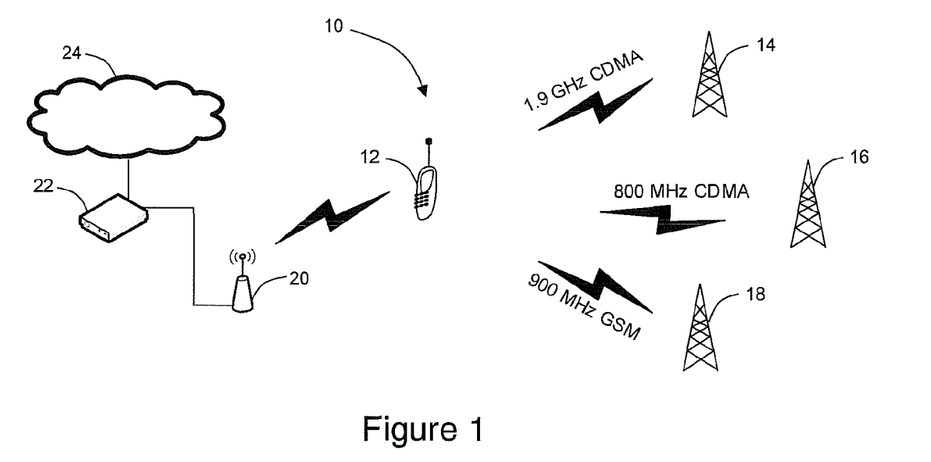
FIG. 1 shows an illustrative multimode wireless communication device configured to communicate using a plurality of different communication bands.

Referring to FIG. 1 there is shown an illustrative multimode wireless communication device configured to communicate using a plurality of different communication bands. In the illustrative system 10, the wireless device is a wireless communications device 12 that is configured to communicate with one or more base stations 14, 16 and 18 using different communication access technologies (CATs). The illustrative base stations may communicate with the wireless communications device using a variety of different communication standards including, but not limited to, various forms of code division multiple access (CDMA), orthogonal frequency division multiple access (OFDMA), and time division multiple access (TDMA) wireless interfaces. By way of example and not of limitation, the wireless communications device 12 communicates with base station 14 using a CAT that operates using CDMA technology at 1.9 GHz. The wireless communications device 12 is also configured to communicate with base station 16 using a CAT that operates using CDMA at 800 MHz. Additionally, the illustrative handset 12 is configured to communicate with base station 18 using a CAT that operates using GSM technology at 900 MHz.

Additionally, the wireless communications device 12 is also configured to monitor signals for a wireless local area network (WLAN) that may include a Wi-Fi access point 20 that is operatively coupled to a modem 22 that provides access to a wide area network such as the Internet cloud 24. In operation, the wireless device 12 with the CAT detection module monitors the WLAN and avoids consuming excessive power by detecting Wi-Fi signals without activating the Wi-Fi CAT receiver module as described in further detail below.

The illustrative wireless device is a wireless communications device 12 that may also be referred to as a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. Each CAT receiver module complies with a wireless standard having a receiver requirement. By way of example and not of limitation, the wireless standard is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX) or IEEE802.16.

Figure 2:
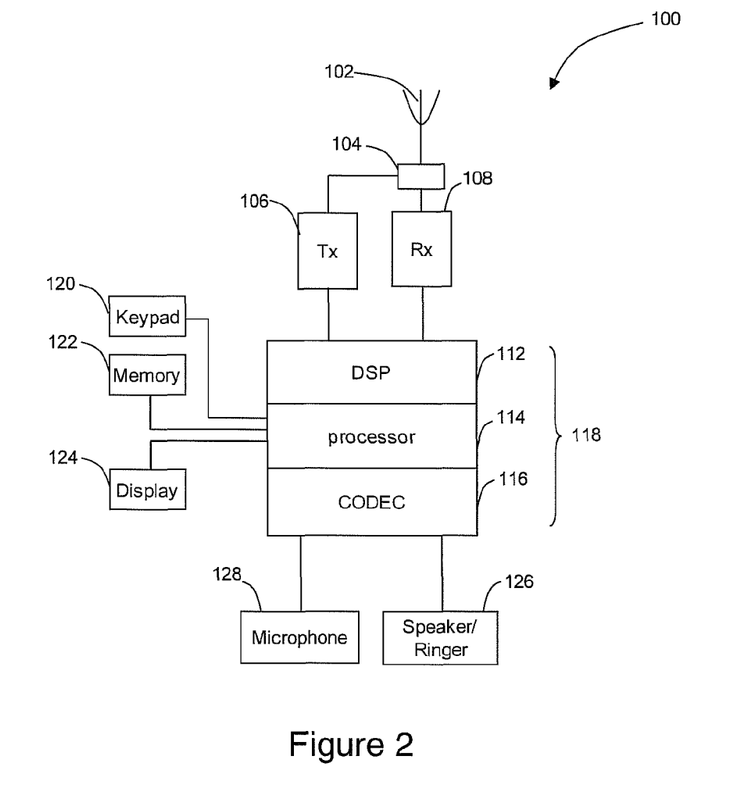
FIG. 2 shows the hardware components of an illustrative wireless communication device.

Referring to FIG. 2 there is shown a wireless communications device comprising a CAT detection module. The wireless communications device 100 is a multimode wireless communication device that is configured to communicate using a plurality of different communication bands as generally described above. The illustrative multimode wireless communications device 100 comprises an antenna element 102 that is operatively coupled to a duplexer 104, which is operatively coupled to a multimode transmitter module 106, and a multimode receiver module 108.

The illustrative multimode transmitter module 106 and multimode receiver module 108 each comprise a plurality of CAT transmitter modules and CAT receiver modules that communicate using separate CATs. It shall be appreciated by those of ordinary skill in the art that the CAT transmitters and receivers may be embodied as a CAT transceiver and may share components.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the CAT transmitter module and receiver module are typically paired and may be embodied as a CAT transceiver. Thus, the terms transmitter, receiver, and transceiver are used interchangeably herein and the distinctions shall be readily apparent to those of ordinary skill in the art.

The DSP 112 may be configured to perform a variety of operations such as controlling the antenna 102, the multimode transmitter module 106, and the multimode receiver module 108. The processor 114 is operatively coupled to a keypad 120, a memory 122, and a display 124. Additionally, the processor 112 is also operatively coupled to the CODEC module 114 that performs the encoding and decoding operations and is communicative coupled to a speaker or ringer 126, and a microphone 128. The CODEC module 114 is also communicatively coupled to the display 124 and provides the encoding and decoding operations for video.

The illustrative wireless communications device 100 may be built as a light weight and small device adapted to be portable and may be conveniently carried around by a user.

The wireless communications device 100 is further adapted for caller operation and is enabled to permit a user to manually input data with the keypad 120 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 128 or a combination of voice information and DTMF signals. The memory module 122 may be used for storing input data or storing programming information that is pre-loaded on the mobile handset 100, or that has been downloaded to the mobile handset 100.

In the illustrative embodiments presented herein, the multiple CATs are configured to share hardware such as antennas, transceivers, logic and processors as described in further detail below. The illustrative power management module or power management means described herein resides in the hardware and software of the wireless communication device 100. By way of example and not of limitation, a Wi-Fi module that is housed within the multimode wireless communication device 100 occupies resources corresponding to the antenna 102, transmitter module 106, receiver module 108, DSP 112 and processor 114. Additionally, at least one cellular communication standard, e.g. CDMA, also uses the same or similar resources corresponding to antenna 102, transmitter module 106, receiver module 108, DSP 112 and processor 114.

Generally, during network communications, at least one CAT receiver module associated with the multimode receiver module 108 is active, and the other CAT receiver modules are in various states of inactivity as described herein. The level of inactivity is managed by an integrated power management module or power management means that balances the need to manage network communications and preserve battery resources.

The illustrative integrated power management module or power management means is configured to manage power for the Wi-Fi module and the cellular communications module. The integrated power management module resides in the wireless communication device 100 and occupies hardware and software resources corresponding to the antenna 102, transmitter module 106, receiver module 108, DSP 112 and processor 114.

The illustrative integrated power management module is configured to manage power for the Wi-Fi module and the cellular communications module. The integrated power management module or power management means comprises a Wi-Fi power save mode, a Wi-Fi sleep mode, a Wi-Fi power down mode, a cellular power save mode, and a cellular low power mode. Note, for purposes of this patent the terms "state" and "mode" are used interchangeably.

The integrated power management module or power management means enables the Wi-Fi power save mode, the Wi-Fi deep sleep mode, and the Wi-Fi power down mode when the wireless communication device is operating in a Wi-Fi power management mode. Additionally, the power management module or power management means enables the cellular power save mode and the cellular low power mode when the wireless communication device is operating in a cellular power management mode. In the illustrative embodiment, the illustrative cellular communications module comprises a CDMA compliant module.

These power management modes optimize power management for a multimode wireless communication device having a Wi-Fi module and a cellular communication module, e.g. CDMA transceiver. The optimization of power management is achieved by minimizing the power consumption of the wireless communication device.

The illustrative integrated power management module supports one mode at a time. Thus, the power management module relies on toggling between the Wi-Fi module and the cellular communications module depending on the current state or mode of the wireless communication device 100 as described in FIGS. 3A and 3B.

Figure 3A:
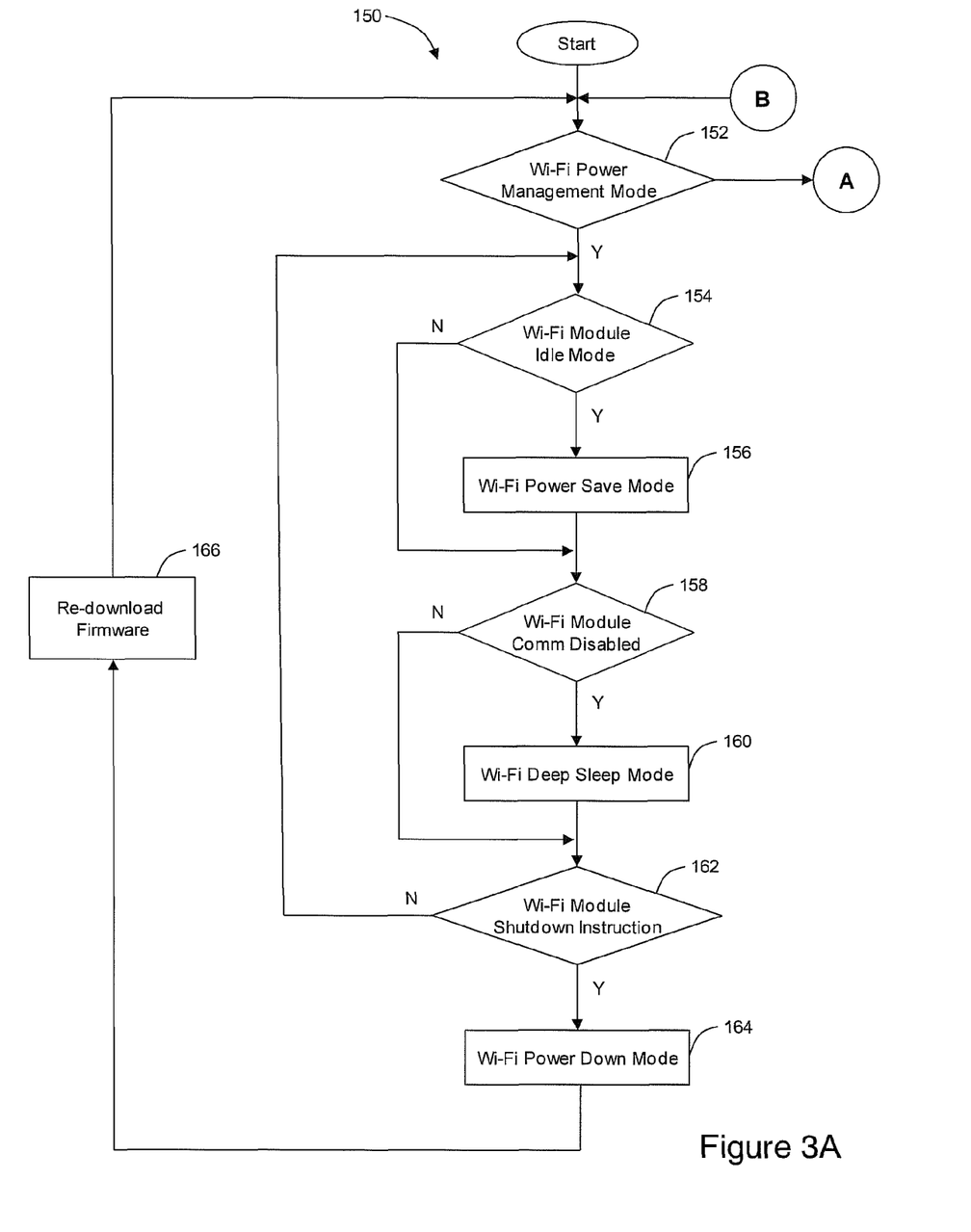
FIGS. 3A and 3B shows a flowchart of the various power management modes for a multimode wireless communication device having a Wi-Fi module and a cellular communications module.
Figure 3B:
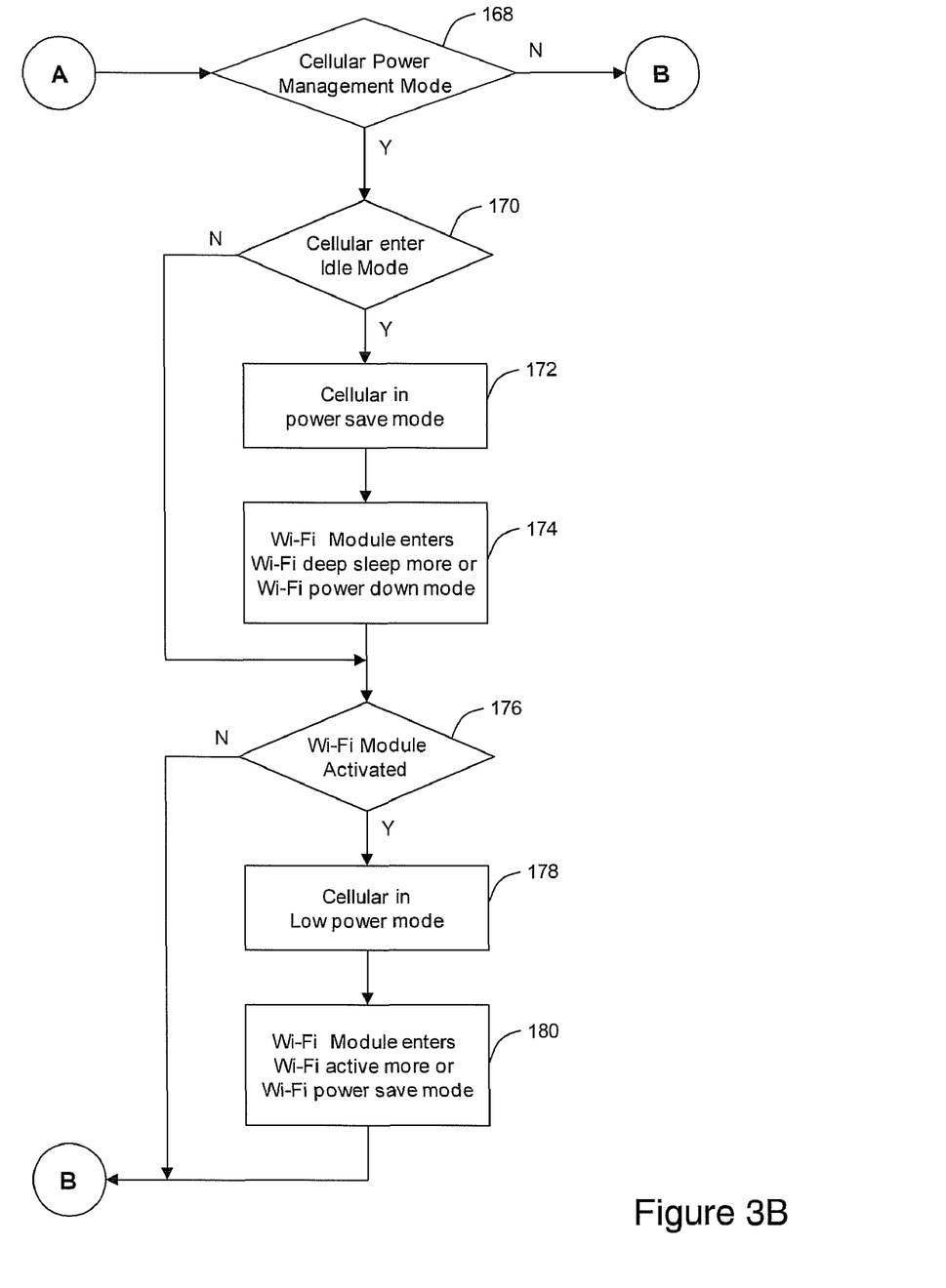

Referring to FIGS. 3A and 3B there is shown a flowchart of the various power management modes for a multimode wireless communication device having a Wi-Fi module and a cellular communications module. The illustrative method 150 is initiated at decision diamond 152 where a decision is made to enter Wi-Fi power management mode. Generally, the decision 152 is triggered by the wireless device 100 operating in a Wi-Fi state by communicating with an access point 20 and the triggering of a Wi-Fi power management mode.

For example, the first Wi-Fi power management mode for the Wi-Fi power save mode is triggered by the Wi-Fi module entering an idle mode or state as shown in decision diamond 154. If the Wi-Fi module enters an idle state, then the Wi-Fi module enters a Wi-Fi power save mode as shown in block 156.

In the Wi-Fi power save mode 156 a timer triggers switching the Wi-Fi module between a Wi-Fi power save awake state and a Wi-Fi power save sleep state. Additionally, the Wi-Fi power save mode further comprises an exit power save mode operation, in which the wireless communication device receives a power save awake instruction and the wireless communication device communicates a power save exit instruction that results in the wireless communication device exiting the power management operations. By way of example and not of limitation, the minimum current consumption for the Wi-Fi module was reduced from 240 mA to 60 mA in the Wi-Fi power save mode 156. A more detailed description of the Wi-Fi power save mode is provided below.

The Wi-Fi deep sleep mode 160 is activated when communications between the Wi-Fi module housed in the wireless device 100 and the access point 20 are disabled or fail. The triggering of the Wi-Fi deep sleep mode is caused by the Wi-Fi communications failing as represented by decision diamond 158. The Wi-Fi communications may be disabled by operations such as user disabled communications, link loss, failure in the Session Initiation Protocol (SIP), and other such Wi-Fi communication failure instances. By way of example and not of limitation, the minimum current consumption for the Wi-Fi module was reduced to 24 mA in the Wi-Fi deep sleep mode 160.

The Wi-Fi power down mode 164 is activated when a Wi-Fi shutdown instruction is received that results in at least one Wi-Fi integrated circuit (IC) being turned off. More particularly, if the instruction received at decision diamond 162 is to shutdown the Wi-Fi module, the Wi-Fi module proceeds to turn off each IC such as the corresponding baseband processor, MAC processor, RF Wi-Fi chip, and almost all the remaining Wi-Fi ICs. To enable the Wi-Fi module to operate in an active Wi-Fi mode, Wi-Fi power save mode, and Wi-Fi deep sleep mode, the firmware must be re-downloaded to the Wi-Fi module as indicated by block 166. By way of example and not of limitation, the minimum current consumption for the Wi-Fi module was reduced to 12 mA in the Wi-Fi power down mode 164.

Referring to FIG. 3B, if the decision made by the power management module or power management means at decision diamond 152 is that there is no need to enter Wi-Fi power management mode, the method proceeds to decision diamond 168 in FIG. 3B. The illustrative method initiated at decision diamond 168 is triggered by the wireless device 100 operating in a cellular state communicating with a base station, in which there is a decision to enter cellular power management mode for the cellular communications module.

If the resulting decision is that there is no need to enter the cellular power management mode, the method returns to decision diamond 152 described above. However, if the resulting decision at diamond 168 is to initiate the cellular power management mode, the method then proceeds to determine whether to enter cellular power save mode 172 or cellular low power mode 178.

At decision diamond 170, the determination of whether the cellular communications module has entered the idle mode is performed. If the answer is yes, the method proceeds to block 172 where the cellular communications module is placed in power save mode. The method also proceeds to block 174 where Wi-Fi module is configured to enter Wi-Fi deep sleep mode 160 or Wi-Fi power down mode 164. Thus, the wireless communication device 100 enters the cellular power save mode 172 when the multimode device is set to operate in a cellular mode such as in the CDMA mode. Thus, the cellular power save mode 172 is enabled when the cellular communications module enters a cellular idle mode 170 and the Wi-Fi module enters either the Wi-Fi deep sleep mode or the Wi-Fi power down mode 174. By way of example and not of limitation, the energy consumption in the cellular power save mode is approximately 40 mA.

At decision diamond 176, the determination of whether the Wi-Fi module has been activated is performed and results in the cellular communications module being placed in low power mode as described in block 178. Additionally, the method proceeds to block 180 where the Wi-Fi module enters either a Wi-Fi active mode or a Wi-Fi power save mode 156. Thus, the cellular low power mode 178 is enabled when the Wi-Fi module is activated and the Wi-Fi module enters either a Wi-Fi active more or the Wi-Fi power save mode 180. By way of example and not of limitation, the current consumption is 240 mA during the active Wi-Fi mode and then changes to approximately 60 mA when the Wi-Fi module enters the power save mode.

If the Wi-Fi module is not activated at decision diamond 176, the method then returns to decision 152 to determine whether to enter the Wi-Fi power management mode as described above.

Figure 4:
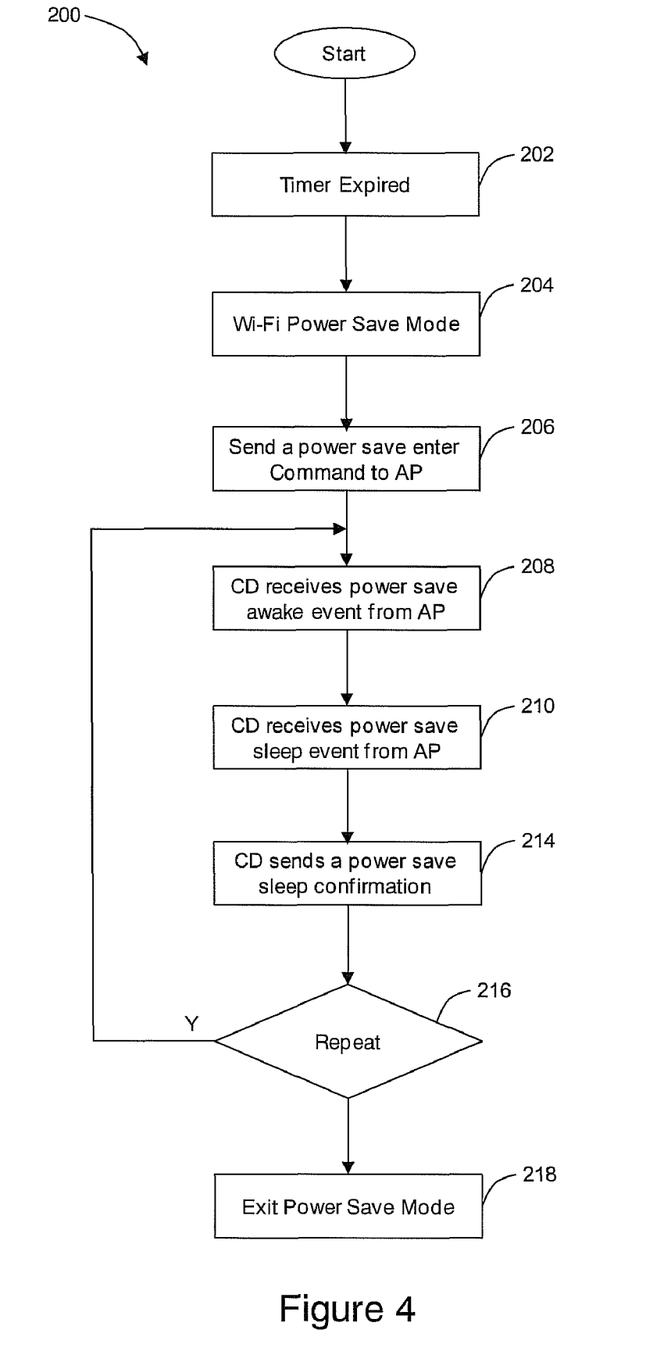
FIG. 4 shows a more detailed illustrative flowchart of the Wi-Fi power save mode.

Referring now to FIG. 4, there is shown a more detailed illustrative flowchart of the Wi-Fi power save mode 156. The method 200 is initiated at block 202 where the timer has expired for the device 100 and the device 100 enters power save mode at block 204. By way of example and not of limitation, the timer in block 202 is a 3 second timer that is started when the device 100 is in a VoIP idle state and continues checking commands other than RSSI commands.

After a timer has expired, the wireless communication device 100 enters the power save mode 156 and sends a power save enter command to the access point 20 as indicated by block 206. After a first predetermine interval, e.g. milliseconds, the wireless communication device 100 receives two events: the first event is the power save awake event from the access point 20 and device 100 moves to an awake state as represented by block 208; and after a second predetermined interval, e.g. seconds, the second event is a power save sleep event at block 210. After receiving these two events, the device 100 proceeds to send a power save sleep confirmation command and the device 100 enters a doze state at block 212. The device 100 remains in a doze state for a third predetermined time interval, e.g. seconds. The device 100 then continues to diamond 216 and repeatedly cycles between the two events, namely, the power save awake event and the power save sleep event. When the device 100 receives an exit power save mode instruction, the device 100 exits the power save mode as represented by block 218.

There are at least two exit power save mode instructions corresponding to the exit power save block 218. The first illustrative exit power save mode instruction occurs after the device 100 has received a power save awake event and the device 100 has changed the device 100 to an awake state. In the awake state the device 100 exits the power save mode by sending the power save exit command. The device 100 then receives a response corresponding to the power save exit command that moves the device 100 to a normal state.

The second illustrative exit power save mode instruction occurs after the device 100 has received a power save sleep event and the device 100 generates a power save exit command to exit the power save mode. The device 100 then awaits a response to the communicated power save exit command and then moves to a normal state.

In the illustrative described above, the RSSI commands can only be sent when the device 100 is in an awake state and not in the dozed state. Thus, if the device 100 is in an a dozed state and the device 100 wants to the send a RSSI command, then the device 100 has to wait until the next power save awake event.

In operation, the power save mode for Wi-Fi is present whenever the phone is in a Wi-Fi "idle" mode, and results from the Wi-Fi module periodically toggling between the sleep mode and awake mode.

During the Wi-Fi power save mode, the illustrative CDMA communications module is in a low power mode. By way of example and not of limitation, the CDMA low power mode includes having the display illumination is disabled and the baseband circuitry is placed in a low power mode. In the illustrative CDMA low power mode, the keypad is monitored for activity, an incoming phone call, or other such triggering event that would trigger the handset to a return to a mid-load standby, active load standby, ring, or talk modes.

Figure 5:
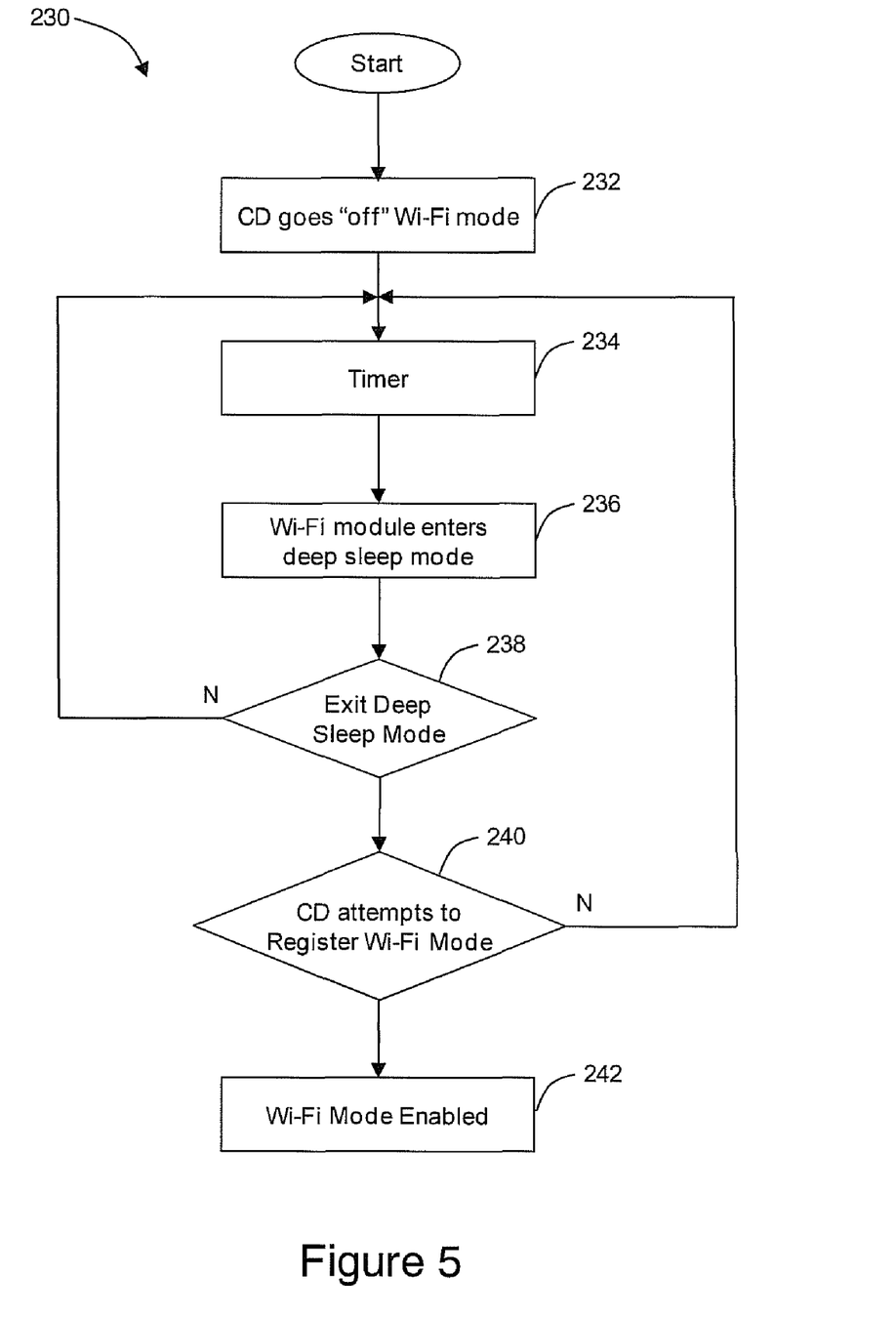
FIG. 5 shows a more detailed illustrative flowchart of the Wi-Fi deep sleep mode.

Referring now to FIG. 5 there is shown an illustrative flowchart of the Wi-Fi deep sleep mode. In the illustrative embodiment, the dual mode handset or communication device 100 enters the deep sleep mode for Wi-Fi when the handset goes "off" Wi-Fi mode due to link loss, user disabled failure in SIP, and similar Wi-Fi related failure cases as indicated by block 232.

By way of example and not of limitation, the Wi-Fi module's main controller communicates with the Wi-Fi client that there has been a Wi-Fi link loss, and the Wi-Fi client informs the Wi-Fi module's main controller that the wireless local area network activity is completed. The Wi-Fi module's main controller then communicates that the client is "off" the Wi-Fi mode to the power management module, which then communicates the status to the serial data interface as represented by block 232. A countdown timer at block 234 may then be repeatedly enabled from the power management module that communicates an instruction to the Wi-Fi module's main controller and places the main controller in deep sleep mode shown in block 236. In the illustrative embodiment, the General Purpose Input/Output (GPIO) pins 71 and 43 are set. The Wi-Fi module's main controller then confirms the command that places the Wi-Fi module in deep sleep mode to the illustrative serial data interface.

To exit the deep sleep mode, the Wi-Fi module's main controller communicates an instruction to activate the Wi-Fi module at decision diamond 238 resulting in the communication device 100 attempting to register to Wi-Fi mode as shown in decision diamond 240. In operation, the illustrative power management module proceeds to reset the GPIO pins 71 and 43, and the Wi-Fi module's serial data interface then proceeds to receive an instruction to wake the Wi-Fi client that is communicated to the power management module.

When the communication device 100 attempts to register to Wi-Fi mode at diamond 240, the power management module proceeds to communicate the Wi-Fi activate event to the Wi-Fi module's main controller, which then communicates the instruction to the Wi-Fi client. If the communication device 100 is unable to register to the Wi-Fi mode, the communication device returns to countdown timer 234 and enters the Wi-Fi deep sleep mode in block 236. However, if the communication device 100 is able to register to the Wi-Fi mode, the Wi-Fi client then proceeds to start the scanning process for the Wi-Fi mode and the Wi-Fi mode is enabled at block 242.

It is to be understood that the detailed description of illustrative embodiments are provided for illustrative purposes. The scope of the claims is not limited to these specific embodiments or examples. For example, the system and method for power management is described in the context of a dual mode wireless communication device, however, this solution may be extended to any multi mode wireless communication device. Therefore, various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A multimode wireless communication device, the device comprising:
    a Wi-Fi module housed within the multimode wireless communication device that is configured to communicate with an access point operatively coupled to a wide area network;
    a cellular communication module housed within the multimode wireless communication device that is configured to communicate with a base station and a mobile switching station; and
    an integrated power management module configured to manage power for the Wi-Fi module and the cellular communications module, the integrated power management module comprising,
        a Wi-Fi power save mode comprising a timer that triggers switching the Wi-Fi module between a Wi-Fi power save awake state and a Wi-Fi power save sleep state,
        a Wi-Fi deep sleep mode that is activated when Wi-Fi communications with an access point are disabled,
        a Wi-Fi power down mode that is activated when a Wi-Fi shutdown instruction is received that results in at least one IC corresponding to the Wi-Fi module being turned off,
        a cellular power save mode is enabled when the cellular communications module enters a cellular idle mode and the Wi-Fi module enters either the Wi-Fi deep sleep mode or the Wi-Fi power down mode, and
        a cellular low power mode that is enabled when the Wi-Fi module is activated and the Wi-Fi module enters either a Wi-Fi active more or the Wi-Fi power save mode.

2. The multimode wireless communication device of claim 1 wherein the Wi-Fi power save mode, the Wi-Fi deep sleep mode, and the Wi-Fi power down mode are activated when the wireless communication device is operating in a Wi-Fi power management mode.

3. The multimode wireless communication device of claim 1 wherein the Wi-Fi power save mode is triggered by the Wi-Fi module entering a Wi-Fi idle mode.

4. The multimode wireless communication device of claim 1 wherein the cellular power save mode and the cellular low power mode are activated when the wireless communication device is operating in a cellular power management mode.

5. The multimode wireless communication device of claim 1 wherein the Wi-Fi power save mode further comprises an exit power save mode operation, in which the wireless communication device receives a power save awake instruction and the wireless communication device communicates a power save exit instruction that results in the wireless communication device exiting the power management operations.

6. The multimode wireless communication device of claim 1 wherein the cellular communications module comprises a CDMA compliant module.

7. The multimode wireless communication device of claim 1 wherein the cellular communications module comprises a GSM compliant module.

8. An integrated power management module housed within a multimode wireless communication device that is configured to manage power for a Wi-Fi module and a cellular communications module, the integrated power management module further comprising:
    a Wi-Fi power save mode comprising a timer that triggers switching the Wi-Fi module between a Wi-Fi power save awake state and a Wi-Fi power save sleep state;
    a Wi-Fi deep sleep mode that is activated when Wi-Fi communications with an access point are disabled;
    a Wi-Fi power down mode that is activated when a Wi-Fi shutdown instruction is received that results in at least one IC corresponding to the Wi-Fi module being turned off;
    a cellular power save mode is enabled when the cellular communications module enters a cellular idle mode and the Wi-Fi module enters either the Wi-Fi deep sleep mode or the Wi-Fi power down mode; and
    a cellular low power mode that is enabled when the Wi-Fi module is activated and the Wi-Fi module enters either a Wi-Fi active more or the Wi-Fi power save mode.

9. The integrated power management module of claim 8 wherein the Wi-Fi power save mode, the Wi-Fi deep sleep mode, and the Wi-Fi power down mode are activated when the wireless communication device is operating in a Wi-Fi power management mode.

10. The integrated power management module of claim 9 wherein the cellular power save mode and the cellular low power mode are activated when the wireless communication device is operating in a cellular power management mode.

11. The integrated power management module of claim 10 wherein the Wi-Fi power save mode is triggered by the Wi-Fi module entering a Wi-Fi idle mode.

12. The integrated power management module of claim 11 wherein the Wi-Fi power save mode further comprises an exit power save mode operation, in which the wireless communication device receives a power save awake instruction and the wireless communication device communicates a power save exit instruction that results in the wireless communication device exiting the power management operations.

13. The integrated power management module of claim 12 wherein the cellular communications module comprises a CDMA compliant module.

14. The integrated power management module of claim 12 wherein the cellular communications module comprises a GSM compliant module.

15. A multimode wireless communication device, the device comprising:
- a Wi-Fi module housed within the multimode wireless communication device that is configured to communicate with an access point operatively coupled to a wide area network;
- a cellular communication module housed within the multimode wireless communication device that is configured to communicate with a base station and a mobile switching station; and
- a power management means configured to manage power for the Wi-Fi module and the cellular communications module, the power management means further comprising,
    - a Wi-Fi power save mode comprising a timer that triggers switching the Wi-Fi module between a Wi-Fi power save awake state and a Wi-Fi power save sleep state,
    - a Wi-Fi deep sleep mode that is activated when Wi-Fi communications with an access point are disabled,
    - a Wi-Fi power down mode that is activated when a Wi-Fi shutdown instruction is received that results in at least one IC corresponding to the Wi-Fi module being turned off,
    - a cellular power save mode is enabled when the cellular communications module enters a cellular idle mode and the Wi-Fi module enters either the Wi-Fi deep sleep mode or the Wi-Fi power down mode, and
    - a cellular low power mode that is enabled when the Wi-Fi module is activated and the Wi-Fi module enters either a Wi-Fi active more or the Wi-Fi power save mode.

16. The multimode wireless communication device of claim 15 wherein the power management means enables the Wi-Fi power save mode, the Wi-Fi deep sleep mode, and the Wi-Fi power down mode when the wireless communication device is operating in a Wi-Fi power management mode.

17. The multimode wireless communication device of claim 16 wherein the power management means claim enables the cellular power save mode and the cellular low power mode when the wireless communication device is operating in a cellular power management mode.

18. The integrated power management module of claim 15 wherein the Wi-Fi power save mode is triggered by the Wi-Fi module entering a Wi-Fi idle mode.

19. The integrated power management module of claim 18 wherein the Wi-Fi power save mode further comprises an exit power save mode operation, in which the wireless communication device receives a power save awake instruction and the wireless communication device communicates a power save exit instruction that results in the wireless communication device exiting the power management operations.

20. The integrated power management module of claim 19 wherein the cellular communications module comprises a CDMA compliant module.

* * * * *